Figure 1:
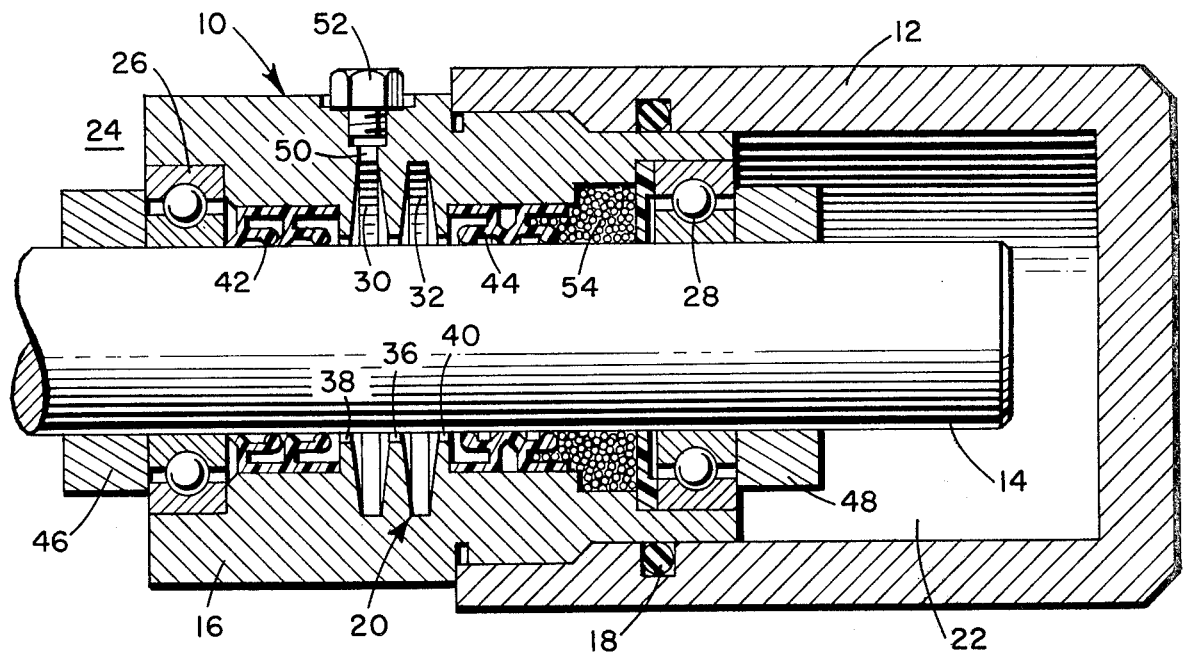

United States Patent [19]

Poncet et al.

[11] B 4,000,930

[45] Jan. 4, 1977

[54] GASTIGHT LIQUID-TYPE DYNAMIC SEAL FOR CONTROL SHAFTS OF PRESSURIZED CIRCUIT INTERRUPTERS

[75] Inventors: Alain Poncet, Grenoble-Villeneuve; Serge Roccaz, Grenoble, both of France

[73] Assignee: Merlin Gerin, Grenoble, France

[22] Filed: Mar. 27, 1975

[21] Appl. No.: 562,413

[44] Published under the second Trial Voluntary Protest Program on March 16, 1976 as document No. B 562,413.

[30] Foreign Application Priority Data

Apr. 10, 1974 France .............................. 74.12701

[52] U.S. Cl. .............................. 308/36.3; 277/135
[51] Int. Cl.² ..................... F16C 1/24; F16C 33/72
[58] Field of Search ............... 308/36.1, 36.3, 187; 277/72 FM, 135

[56] References Cited

UNITED STATES PATENTS

| 2,067,034 | 1/1937 | Whiteley | 308/36.3 |
|---|---|---|---|
| 2,288,638 | 7/1942 | Nazro | 277/135 |
| 2,518,338 | 8/1950 | Lampe | 308/36.1 |
| 2,621,087 | 12/1952 | Kluge | 308/36.3 |
| 2,799,532 | 7/1957 | Smart | 277/135 |
| 2,921,804 | 1/1960 | Jekat | 308/36.3 |
| 3,347,604 | 10/1967 | Lavelle et al. | 308/36.3 |
| 3,439,963 | 4/1969 | Hein et al. | 308/187 |
| 3,452,839 | 7/1969 | Swearingen | 308/36.3 |

*Primary Examiner*—Lloyd L. King
*Attorney, Agent, or Firm*—Stevens, Davis, Miller & Mosher

[57] ABSTRACT

A gastight dynamic seal sealing the pressurized enclosure of a compressed-gas circuit interrupter to a rotatable through control shaft. Radial partition walls of a sleeve surrounding the shaft define a plurality of liquid-filled gas-trap chambers separated by small throttle passageways causing the gas leaking through elastomer joints disposed in some of said chambers to be dissolved in the liquid in degressive concentration, going from the pressurized side of the seal towards the atmospheric side thereof.

4 Claims, 2 Drawing Figures

GASTIGHT LIQUID-TYPE DYNAMIC SEAL FOR CONTROL SHAFTS OF PRESSURIZED CIRCUIT INTERRUPTERS

This invention relates to compressed-gas circuit interrupters, such as sulfur-hexafluoride puffer-type interrupters, and more particularly to gastight dynamic seals sealing the pressurized enclosure of the circuit interrupters to a rotatable control shaft passing through the enclosure.

The problem to seal off the shaft controlling the position of the contacts of a compressed-gas circuit interrupter at the passage of the shaft through the pressurized housing of the circuit interrupter has been mastered in certain known devices by the use of a chamber disposed intermediate the pressurized side and the atmospheric pressure side of the sealing device and containing a viscous oil or grease under a pressure that is maintained at a value higher than either of the gas pressures. In this manner any leakage of gas towards the intermediate chamber is prevented but not a leakage of the viscous substance under pressure towards the gaseous medium so that a frequent checking of the fluid level is necessary.

It is an object of the invention to provide a dynamic seal of high reliability which does not need any pressurizing of the sealing fluid.

Figure 2:
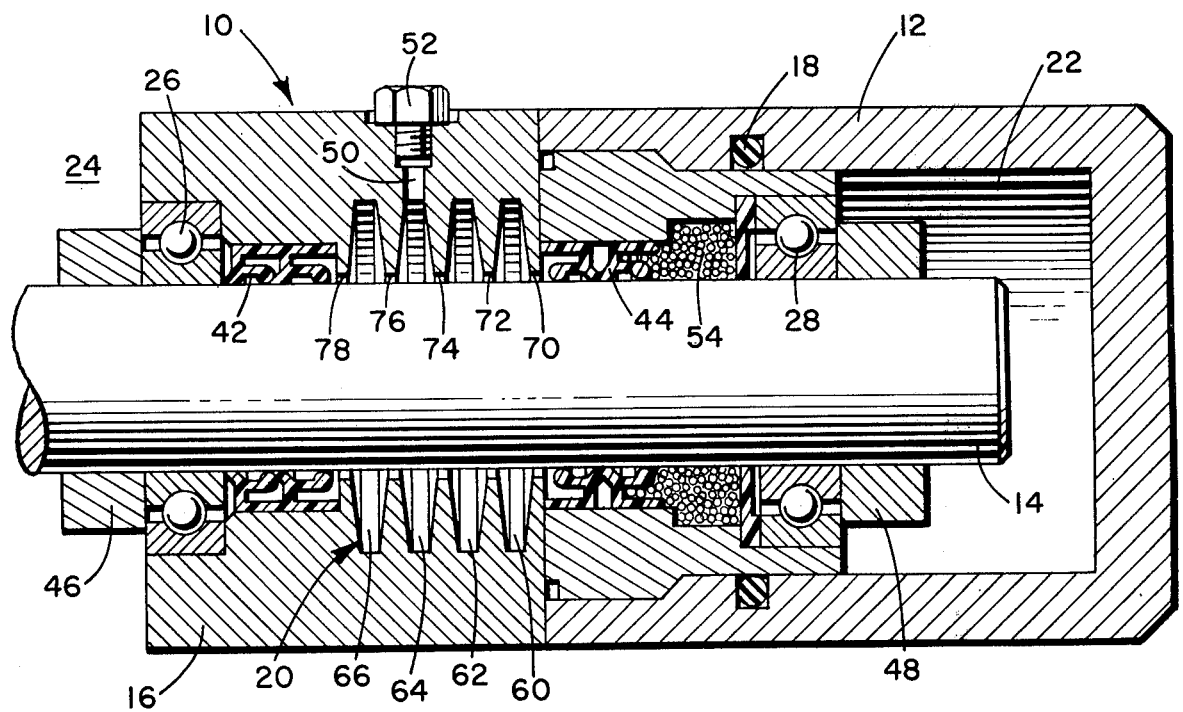

This and other objects and advantages of the invention will become apparent upon reading of the following description of two embodiments of the invention given by way of examples only and shown in the annexed drawings, in which:

FIG. 1 is a diagrammatic view in axial section of a dynamic seal according to the invention; and FIG. 2 shows another embodiment of the invention.

In FIG. 1 the dynamic seal is generally designated by the reference numeral 10. The housing 12 forms part of the pressurized enclosure of the circuit interrupter (not further shown) which may be a sulfur hexafluoride puffer-type circuit interrupter. The contacts of the circuit interrupter are operated by a rotatable control shaft 14 of which only the end stud is seen in the Figs. The seal comprises a stationary metal sleeve member 16 of generally cylindrical shape which is coaxial with the stud 14. The sleeve 16 is secured in a gastight manner to the enclosure 12 by a gasket 18, such as an O-ring and the dynamic seal sealing the sleeve to the rotatable shaft 12 is generally designated by the reference numeral 20. The inside 22 of the housing 12 is filled with a gas, such as sulfur hexafluoride, at a pressure above the atmospheric pressure prevailing at the outside 24 of the apparatus. The end portions of the sleeve 16 are mounted on the outer races of a pair of roller bearings 26, 28, the inner races of which revolve with the stud 14. The dynamic seal 20 arranged between the bearings 26 and 28 comprises a plurality of gas-trap chambers spaced apart in the longitudinal direction of the stud 12 and separated by generally disc-shaped collars or partition walls, such as 34, extending radially inwardly and which clear the stud so as to leave very small throttle passageways 36, 38, 40 between successive chambers along the stud 12, the inner diameter of the collars 34 being only slightly greater than the outer diameter of the stud 12. The collars define therebetween a pair of generally disc-like radial chambers 30, 32 comprised between a pair of generally cylindrical outer chambers containing flexible lip-type elastomere baffle joints 42 and 44, respectively, bearing peripherally against the sleeve 16 and centrally against the stud 12 with which the lips of the joints are in frictional contact in a known manner. Thrust stop rings 46 and 48 fix the bearings 26, 28 and the sleeve 16 in axial position on the stud 12. The chambers form with the collars or plates 34 a series of baffles communicating therebetween by the passageways 36, 38, 40. The chambers are filled with a viscous liquid, such as paraffin oil, through a conduit 50 which may be closed by a screw 52. A molecular sieve 54 may advantageously be inserted between the joint 44 and the bearing 28 at the pressure side of the seal.

This device operates in the following manner:

Initially, the gas, such as the sulfur hexafluoride, in the enclosure 22 is at a pressure $p$ and the concentration of the gas in the oil of the dynamic seal 20 is zero so that the pressure differential across the joint 44 of the seal is $p$. The angular displacement of the control shaft 14 during the operation of the circuit interrupter in either sense may be of the order of 60°. The porosity of the elastomer joints causes a leakage of gas through the joint 44, substantially independently of the thickness of the elastomer material. The amount of leakage $f_1$ across the elastomer joint is proportional to the pressure differential across the joint 44. The leakage gas diffuse eventually into the oil of the chamber 32. The leakage $f_2$ across the central passageway 36 is a function of the concentration differential of gas in the chambers 32 and 30, respectively. The leakage $f_2$ is much lower than the leakage $f_1$ and the gas concentration in the liquid contained within chamber 32 reaches the saturation value. From then on, the gas bubbles passing through the joint 44 are no longer dissolved into the oil of chamber 32 and produce a foaming of the oil. A very small part of the gas bubbles passes from the chamber 32 to the chamber 30 and are laminated at their going through the passageway 36 so as to be easily dissolved in the chamber 30. The gas concentration gradient existing in the chamber 32 and which may cause a migration of gas bubbles towards the chamber 30 is very small. Also, the oil pressure increases in the chamber 32 and tends to reduce the leakage due to porosity. The overall gas concentration decreases linearly towards the outlet of the dynamic seal 20. The molecular sieve 54 filters the decomposition products of the sulfur hexafluoride gas.

The dynamic seal according to the invention may also be used in the case of a translative control rod 14. In this case, the lip joints 42, 44 are replaced by suitable side joints and the roller bearings are to be substituted by appropriate slide bearings.

The amount of leakage of the gas is a function of the length of the diffusion path in the oil, of the density and the viscosity of the oil, of the lining of the control stud and of the nature of the joints 42, 44. FIG. 2 shows an embodiment of a dynamic seal 20 having four central disc-shaped chambers 60 to 66 filled with oil and bordered by five passageways 70 to 78 causing a reduction of the amount of leakage relative to the device shown in FIG. 1.

The lip joints 42, 44 may be replaced by rings mounted on the shaft 14 and additional joints may be provided, for instance at the passageways separating the different chambers.

What we claim is:

1. Gastight dynamic seal sealing the pressurized enclosure of a compressed-gas circuit interrupter to a movable control stud extending through said enclosure, comprising:
- a stationary sleeve member connected in a gastight manner to said enclosure and surrounding said stud,
- bearing means supporting said stud from said sleeve for free movement of said stud relative to said sleeve,
- a plurality of gas-trap chambers defined between said sleeve and said stud, said chambers being spaced apart in the longitudinal direction of said stud and separated by partition wall means clearing said stud so as to leave small throttle passageways between successive chambers along said stud, and
- flexible baffle joint means disposed in at least a part of said chambers and bearing against said sleeve in friction and sealing relation with said stud,
- said chambers containing a viscous gas-trap liquid dissolving the gas leaking from the interior of said enclosure through said baffle joint means whereby said passageways produce a degressive concentration of the dissolved gas in successive chambers.

2. Dynamic seal according to claim 1, said sleeve having a generally cylindrical shape, said partition walls comprising generally disc-shaped collars extending radially inwardly.

3. Dynamic seal according to claim 1, said liquid consisting mainly of paraffin oil.

4. Dynamic seal according to claim 1, said baffle joint means comprising a pair of lip-carrying elastomer joints disposed in the outer gas-trap chambers, respectively, a molecular sieve being associated with one of said joints.

* * * * *